Sept. 15, 1925.  
H. H. MORGAN  
COMBINED JACK AND PUMP  
Filed July 19, 1923  
1,553,831  
2 Sheets-Sheet 1
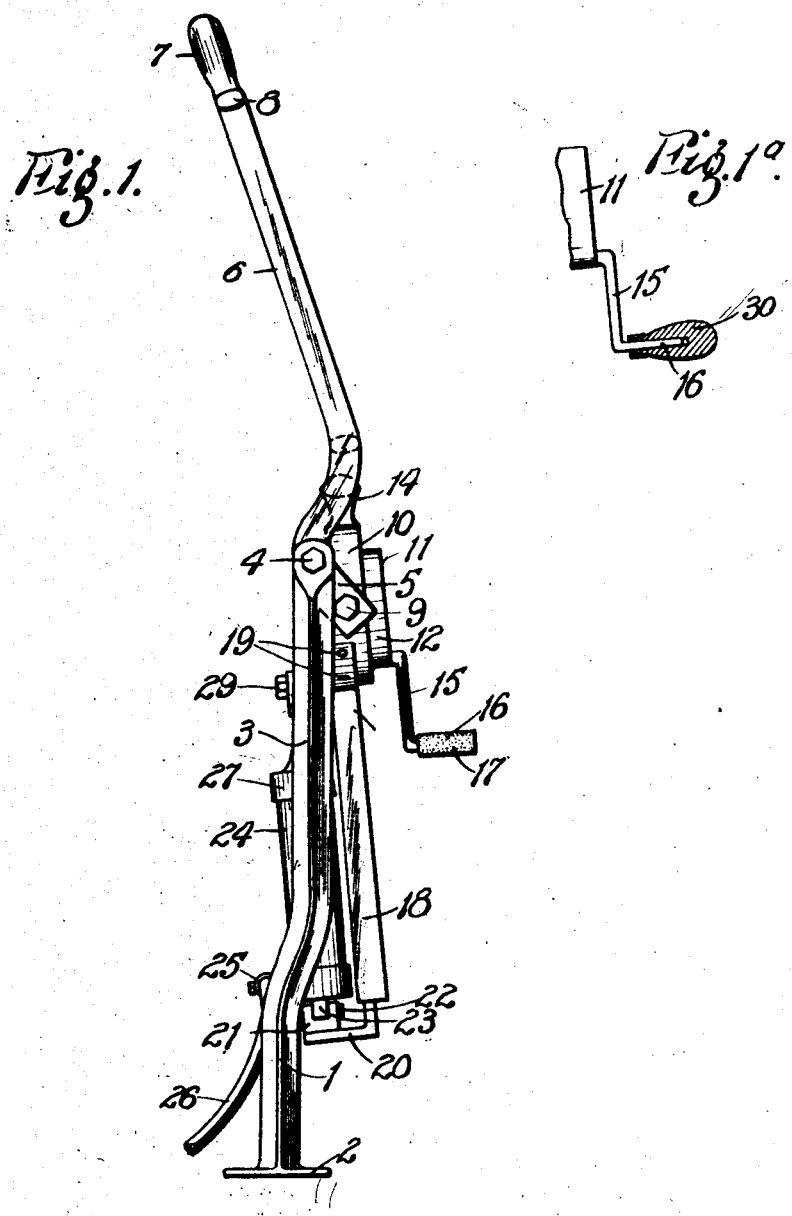
Inventor  
Harvey H. Morgan  
By Bruce S. Elliott  
Attorney

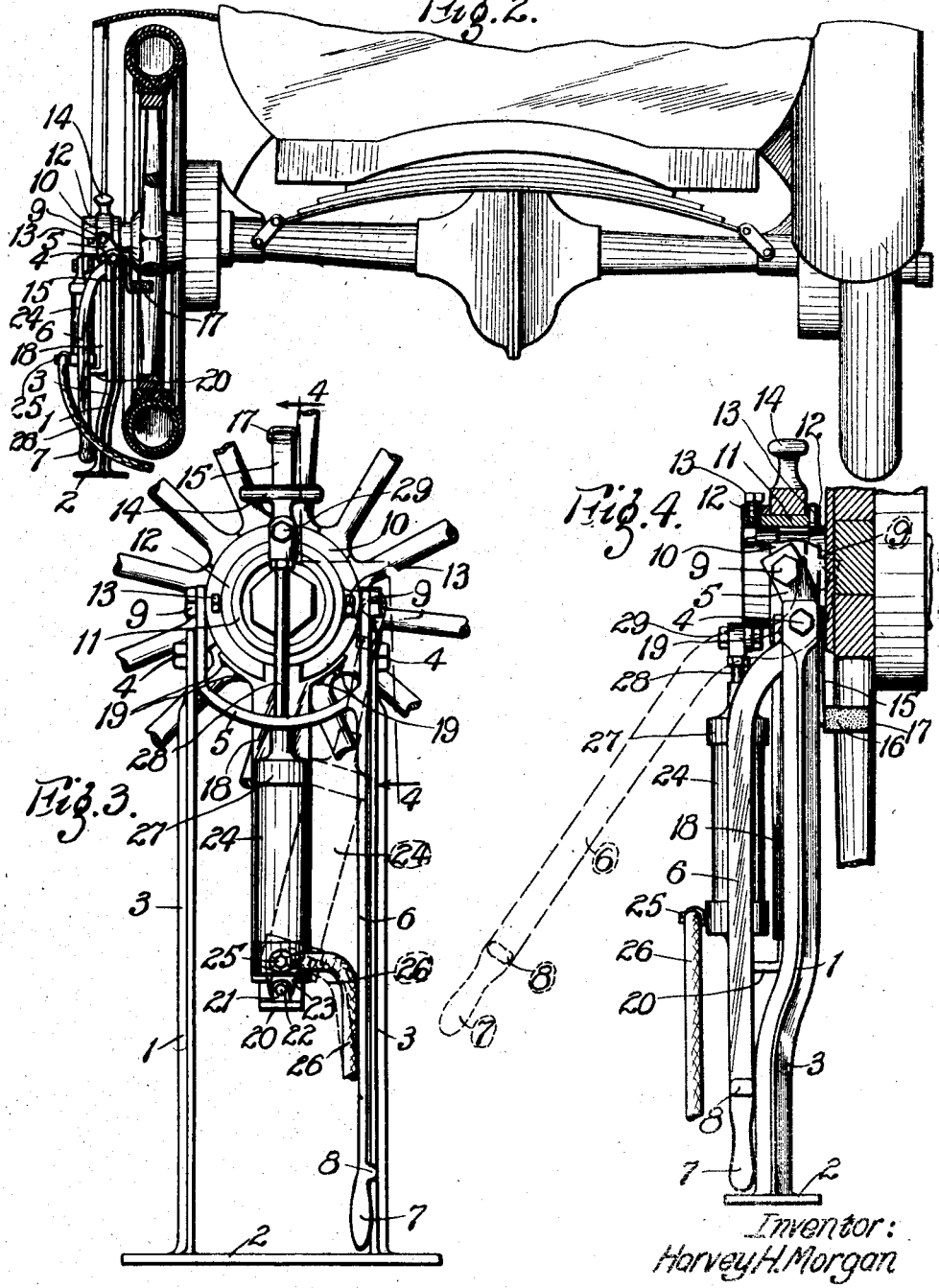

Patented Sept. 15, 1925.

1,553,831

UNITED STATES PATENT OFFICE.

HARVEY H. MORGAN, OF EAST ST. LOUIS, ILLINOIS.

COMBINED JACK AND PUMP.

Application filed July 19, 1923. Serial No. 652,657.

*To all whom it may concern:*

Be it known that I, HARVEY H. MORGAN, a citizen of the United States, residing in East St. Louis, in the county of St. Clair and State of Illinois, have invented new and useful Improvements in Combined Jacks and Pumps, of which the following is a specification.

This invention relates to a novel implement for use with automobiles and has for its general object the provision of a device which may be used for jacking up a car and inflating the tires.

To this end, the invention resides in a stand to rest on the ground, a lever pivotally mounted in the upper end thereof, a frame carried by the lever and adapted to be raised and lowered thereby, said frame supporting in its upper end a circular rotatable member adapted to pass over the hub of the wheel, and provided with a crank arm adapted to pass between the spokes of the wheel, and supporting in its lower portion a pump having its piston rod attached at its upper end to the said rotatable member whereby, when the said member is inserted over the hub of a rear wheel and the lever depressed, the wheel will be raised, and the crank arm being between the spokes of said wheel when the engine is started running, the pump piston will be rapidly reciprocated to force air through a tube leading from the pump into the tire or tires needing to be inflated.

The invention is illustrated in the accompanying drawing in which—

Figure 1 is a view in side elevation of a combined jack and pump constructed according to my invention;

Figure 1ª is a detached view in side elevation of the crank arm showing how the device can be manually operated as a pump, if desired;

Figure 2 is a view in rear elevation of a car showing my device in position and one of the rear wheels jacked up thereby, said wheel being broken away to illustrate the application of the crank to the spokes thereof;

Figure 3 is a view in side elevation showing the parts on an enlarged scale as they appear in Figure 2; and Figure 4 is a sectional view taken on the line 4—4 of Figure 3.

Referring now to the drawings, the numeral 1 indicates the supporting standard of my improved device comprising a base plate 2 adapted to rest upon the ground, and side bars 3 projecting upward from the base. Pivotally mounted in the upper ends of the side bars 3, as indicated at 4, is a yoke member 5 from one end of which projects rearwardly a lever 6 having a handle 7 at its outer end and provided on its side adjacent to the handle 7, with a lug 8 which is adapted to engage one of the side bars 3 to limit the downward movement of the lever 6. Pivotally mounted in the outer ends of the yoke member 5, as indicated at 9, is an annular bearing 10 in which is rotatably mounted a ring 11 which is held in position by means of collars 12 applied to either side of the annular bearing 10 and secured to the ring 11 by screws 13. For convenience in carrying the device, the upper side of the annular bearing 10 is provided with a handle 14. Extending radially outward from the ring 11 is an arm 15 bent outward at right angles to itself to furnish a crank 16 which latter is adapted, in the operation of the device, to be inserted between the spokes of the wheel. To prevent marring the latter, I preferably apply a piece of rubber tubing 17, or the like, on the crank end 16. The numeral 18, Figure 1, indicates a U-bar which at its upper end is slit and bent outwardly at either side to form flanges which, as shown by Figure 3, engage the under side and the face of the annular bearing 10 to which they are secured by screws 19. At its lower end the bar 18 has its flange portions cut away and its flat body portion turned outward at right angles, as indicated at 20, Figure 1, this portion forming a support for a bearing 21 in which is pivotally mounted at 22 a lug 23 projecting from the bottom end of a pump cylinder 24. At its lower end the pump cylinder is provided with a nipple 25 to which a length of hose 26 may be attached, said hose having at its outer end the usual valve arrangement to enable the hose to be connected with the inflation valve of the tire. At its upper end, the pump cylinder has secured on it a cap 27 which provides a bearing for a piston rod 28 having, as usual, within the pump cylinder, a piston (not shown). The piston rod 28 is pivotally secured at its upper end, at 29, to the outer edge of the ring 11.

In operation, it being desired to inflate a tire, the device is carried by the handle 14 and placed beside one of the rear wheels and the ring 11 inserted over the hub cap thereon and the crank 16 between the spokes of the wheel, as shown in Figures 2 and 4 particularly. The handle 7 is then grasped and the lever 6 turned downward until the lug 8 engages the corresponding side bar 3. This, of course, raises the wheel from the ground owing to the leverage afforded by pivoting the yoke member 5 at its base to the bars 3, and at its outer end to the ring 10. The leverage is very great so that a child can depress the lever 6 to jack up the wheel. When this has been done, the engine is then started and the rotation of the wheel will cause the crank arm 15 and the wheel 11 to rapidly rotate, and as the piston rod 28 of the pump is secured to said ring, the pump piston will be rapidly reciprocated in the pump cylinder with the result that the ordinary tire can be inflated in approximately half a minute. The bottom of the pump being pivotally mounted at 22 on the supporting U-bar 18, may readily rock on said pivot, as indicated by dotted lines in Figure 3. This, of course, is necessary to accommodate the pump cylinder to the varying positions of the piston rod 28.

The tubing 26, employed, is long enough to reach from the pump, when in use, to the other three wheels of the car. If the tire of the wheel jacked up also must be inflated, it will, of course, be necessary to remove the jack from such wheel and apply it to the wheel on the opposite side of the car. After the tire has been inflated, the jack is readily removed by lifting the lever 6 to permit the jacked up wheel to again rest on the ground.

From an inspection of Figure 1, it will be seen that the annular bearing 10, ring 11, support 18 and pump 24 are all pivotally mounted at the points 9 in the ends of the yoke member 5. This provides a flexible connection, enabling the pump portion of the device to be properly positioned on the hub of the wheel irrespective of the exact position of the base 2 and bars 3 of the jack.

If it is desired to manipulate the pump by hand, a handle, such as indicated at 30, in Figure 1ª, may be inserted on the crank 16 which will permit the ring 11 to be rotated to reciprocate the piston of the pump.

I have referred, in the specification and claims, to the application of my device to a rear wheel of an automobile. This is because practically all automobiles have only the rear wheels driven. It will be obvious, however, that in the event automobiles having a four-wheel drive come into general use, that my improved device can be applied to a front driven wheel as well as to a rear driven wheel. Inasmuch, however, as four-wheel driven cars are not in general use, I have thought it better to refer to the application of the device to a rear wheel as this is in harmony with the drawings.

I claim:

1. A combined jack and pump for use in inflating the tires of automobiles, comprising a rotatably supported member insertable over the hub of a rear wheel, a crank arm carried by said member and adapted, in use, to be positioned between the spokes of the wheel, a pivotally mounted pump having a piston rod pivotally secured at its outer end to said rotatable member, and means for elevating said member to raise the wheel, whereby, with the engine running, the rotation of said wheel will actuate said pump, said rotatable member and pump being pivotally supported as a unit on said elevating means.

2. A combined jack and pump for use in inflating the tires of automobiles, comprising a support, a lever pivotally mounted on said support, a bearing pivotally mounted on said lever, an annular member rotatably mounted in said bearing and insertable over the hub of a rear wheel, a crank arm carried by said annular member and adapted, in use, to be positioned between the spokes of said wheel, a frame carried by said bearing, a pump pivotally mounted thereon, and a piston rod in said pump having its upper end pivotally secured to said annular member.

3. A combined jack and pump for use in inflating the tires of automobiles, comprising a standard, a lever pivotally mounted thereon, a frame pivotally mounted on said lever, a rotatable member mounted in said frame and insertable over the hub of a rear wheel of a car, an arm mounted on said member and having a crank insertable between the spokes of a wheel, a pump pivotally mounted on said frame at its lower end, and a piston rod for operating the piston of said pump pivotally secured at its upper end to said rotatable member.

4. A combined jack and pump for use in inflating the tires of automobiles, comprising a pivotally supported lever, a frame pivotally mounted on said lever, an annular member rotatably mounted in said frame and having a crank arm, a pump pivotally mounted at its lower end on said frame, a piston rod for said pump having its upper end pivotally secured to said annular member, and a length of hose connected at one end to an outlet from said pump and of a length to reach to the various wheels of the car.

In testimony whereof, I have hereunto set my hand.

HARVEY H. MORGAN.